(12) United States Patent
Klier et al.

(10) Patent No.: US 8,673,533 B2
(45) Date of Patent: *Mar. 18, 2014

(54) AQUEOUS DISPERSIONS FOR USE AS TONERS

(71) Applicant: Dow Global Technologies LLC, Midland, MI (US)

(72) Inventors: John Klier, Midland, MI (US); Richard Dicran Varjian, Hutchinson, MN (US); Alastair Stewart Hill, Schonenberg (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,221

(22) Filed: Nov. 27, 2012

(65) Prior Publication Data

US 2013/0084522 A1 Apr. 4, 2013

Related U.S. Application Data

(60) Continuation of application No. 13/192,374, filed on Jul. 27, 2011, now Pat. No. 8,329,812, which is a division of application No. 11/712,206, filed on Feb. 28, 2007, now Pat. No. 8,007,978.

(60) Provisional application No. 60/779,126, filed on Mar. 3, 2006.

(51) Int. Cl.
*G03G 5/00* (2006.01)

(52) U.S. Cl.
USPC .................................................. 430/137.1

(58) Field of Classification Search
USPC ...................................................... 430/137.1
See application file for complete search history.

(56) References Cited

U.S. PATENT DOCUMENTS

| | | | |
|---|---|---|---|
| 5,840,462 A * | 11/1998 | Foucher et al. | 430/137.14 |
| 6,207,339 B1 * | 3/2001 | Kato et al. | 430/137.15 |
| 6,432,605 B1 | 8/2002 | Yoon | |
| 6,894,090 B2 | 5/2005 | Shinzo et al. | |
| 8,007,978 B2 | 8/2011 | Klier et al. | |
| 8,329,812 B2 | 12/2012 | Klier et al. | |

FOREIGN PATENT DOCUMENTS

JP 2004-204033 7/2004

OTHER PUBLICATIONS

PCT Search Report; from counterpart PCT Application No. PCT/US2007/005528.
Japanese Office Action dated Mar. 15, 2013; from Japanese counterpart Application No. 2008-557428.
Instructions to Japanese Office Action dated May 10, 2013; from Japanese counterpart Application No. 2008-557428.
Japanese Response to Office Action dated May 15, 2013; from Japanese counterpart Application No. 2008-557428.

* cited by examiner

*Primary Examiner* — Mark A Chapman

(57) ABSTRACT

A compound that includes an aqueous dispersion, wherein the dispersion includes a thermoplastic resin and at least one stabilizing agent, and at least one selected from the group consisting of a colorant and a magnetic pigment, wherein the dispersion has an average volume diameter particle size from about 0.05 to about 10 microns is described.

13 Claims, 1 Drawing Sheet

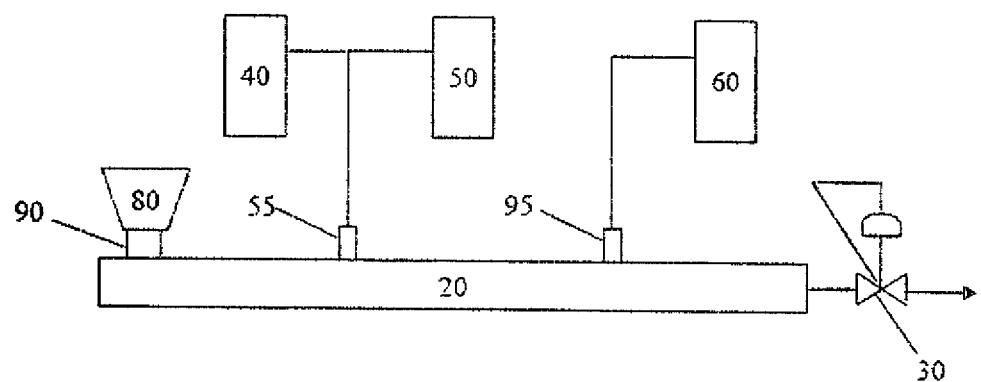

AQUEOUS DISPERSIONS FOR USE AS TONERS

CROSS-REFERENCE TO RELATED APPLICATION

This application is a continuation of U.S. application Ser. No. 13/192,374, filed Jul. 27, 2011, now U.S. Pat. No. 8,329,812, which was a division of U.S. application Ser. No. 11/712,206, filed Feb. 28, 2007, now U.S. Pat. No. 8,007,978, which claims priority to U.S. Provisional Application No. 60/779,126, filed Mar. 3, 2006, the disclosure of which is incorporated herein by reference.

BACKGROUND OF INVENTION

1. Field of the Invention

The present invention relates generally to aqueous dispersions. More specifically, the present invention relates to dispersion compounds that are useful as a print toner.

2. Background Art

In conventional electrophotography processes, a photoreceptive surface is charged with a negative electrical charge, which is then exposed to an image. Because the illuminated sections (the image areas) become more conductive, the charge dissipates in the exposed areas to form a latent image. Negatively charged toner particles spread over the surface adhere to the latent image area to form a toner image. Alternatively, a photosensitive surface is uniformly charged with static electricity, and a latent image may be foamed thereon by exposing image area to light. Toner particles are spread over the surface and adhere to the light-formed latent image, which has less of a negative charge than the surrounding surface, thereby forming a toner image and making the latent image visible. If required, the toner image may be transferred onto a transfer material, such as paper. The toner image may then be fixed via fixing means, such as, by heat, pressure, heat and pressure, or solvent vapor to obtain a fixed image. Such process is described, for example, in U.S. Pat. No. 2,297,691.

Typically, toners used in the development and subsequent fixing of toner images in electrophotography have been produced by melt mixing a thermoplastic resin with a coloring agent made of a dye and/or pigment to produce a resin composition having the coloring agent uniformly dispersed therein. To obtain a toner composition having a particular particle size, the resin composition may be pulverized and/or classified to remove coarse and/or fine particles that may affect the quality of the resulting image. Optimizing the particle size distribution of the toner will allow for a high resolution image. In particular, larger particles can cause blockage while ultra fine dust particles adhere to the print head surface and are too small to have enough charge to be controllable. Thus, as higher resolution images are desired, especially high resolution color images, smaller particle sizes and narrower particle size distributions are needed. Small particles are also desirable because they typically result in improved printing speeds and lower costs per page.

The typical pulverization processes for producing these toners, while able to control the size of the toner particles to produce a high quality toner, often have certain practical limitations. For example, pulverization is a costly and inefficient process for obtaining small particle size, and puts constraints on the type of polymer that may be used, so polymers that are excellent in every other respect may be excluded because they cannot be pulverized. Additionally, a block of a resin composition in which a colorant is dispersed is required to be micro-pulverized by means of an economically usable production device. However, because the resin composition is fragile, particles having a wide range of particle sizes are easily produced when the resin composition is micro-pulverized at high speed. Additionally, such fragile material is liable to be further pulverized in a developing apparatus of a copying machine.

Furthermore, in this pulverization process, it is extremely difficult to uniformly disperse solid fine particles such as the coloring agent in a resin. Therefore, sufficient attention must be paid to the degree of dispersion to avoid potential increased fogging, a reduced image density, and decreased color mixing or transparence of the toner, depending on the degree of dispersion. Additionally, the shape and surface conditions of such toner particles, which may also greatly affect the quality of a toner image, are determined by the cleavage fractures of the resultant particles in the pulverization. Specifically, the pulverization process presents difficulties in controlling the surface conditions of the toner particles, thus when the coloring agent is exposed from the cleavage surface of fine particles of the resin composition, the quality of the developing image may be reduced.

Therefore, to overcome the problems associated with the pulverization process, it has been previously proposed to produce a chemically produced toner through polymerization, which is described, for example, in U.S. Pat. No. 4,816,366. The polymerization process is a process of producing colored polymer particles (i.e., colored resin particles) by mixing a polymerizable monomer with additive components such as a colorant, a charge control agent, and a parting agent to prepare a polymerizable monomer composition and then polymerizing the polymerizable monomer composition by suspension polymerization, emulsion polymerization, dispersion polymerization, or the like. Alternatively, chemically produced toners may also be produced by aggregating preformed polymers with the necessary pigment and additives. In the polymerization processes, the polymer component formed by the polymerization becomes a binder resin to directly form the colored polymer particles.

By eliminating the pulverization step, suspension polymerization or emulsion polymerization can use a softer material for toner particles that need not be as fragile. The integrity of the shape of the toner particles may be better maintained, which also prevents the coloring agent from being exposed on the surface of the toner particles. Furthermore, the classification step may optionally be omitted; thus, significant cost reduction effects such as energy savings, a reduced production time, and an improved step yield may be achieved.

However, toners produced by these polymerization processes are not without inherent limitations. For example, these limitations may include high capital requirements, that the resulting toners may contain residual monomer or be contaminated with additives, and that limitations on polymer type may exist. Specifically, with respect to the limitations on the types of polymers that may exist, typically, only polymers which can be polymerized in the presence of water may be used, thus excluding broad types of polymers. For example, the polymerization processes of some polymers, including some polyolefins, are intolerant of water. With respect to residual monomers, it is difficult to completely react the polymerizable monomer in the polymerization step for forming the binder resin, and thus, an unreacted polymerizable monomer often remains in the resin. As a result, the toner may often contain residual, unreacted monomer. When the toner containing the residual, polymerizable monomer is used in an image forming apparatus, the polymerizable monomer is vaporized out of the toner by heating in a fixing step to worsen a working environment or emit offensive odor. When the content of the polymerizable monomer in the toner is high, the toner also tends to undergo blocking during its storage to aggregate or to cause an offset phenomenon or toner filming on individual members in the image forming apparatus.

Attempts to remove the polymerizable monomer have varied in their success due to the various additives that readily absorb any residual polymerizable monomer in the polymerized toner. The absorbance of the residual monomer by the additives complicates the removal of the residual monomer, as compared to removal of monomer from the binder resin alone. Even when the polymerized toner is fully washed after the polymerization, it is difficult to remove the residual polymerizable monomer adsorbed within the polymerized toner. Attempts to remove the residual polymerizable monomer by heat treatment of the polymerized toner results in aggregation of the polymerized toner.

U.S. Pat. No. 6,894,090 discloses a toner using certain types of resins, but specifically requires an organic solvent.

Accordingly, there exists a need for compositions and methods of forming high performance toner that will produce a high quality image without residual side effects.

SUMMARY OF INVENTION

In one aspect, the present invention relates to a compound that includes an aqueous dispersion, wherein the dispersion includes a thermoplastic resin and at least one stabilizing agent, and at least one selected from the group consisting of a colorant and a magnetic pigment, wherein the dispersion has an average volume diameter particle size from about 0.05 to about 10 microns.

In another aspect, the present invention relates to a method for forming a toner that includes forming a compound that includes an aqueous dispersion and a colorant, wherein the dispersion includes a thermoplastic resin and at least one stabilizing agent, and wherein the dispersion has an average volume diameter particle size from about 0.05 to about 10 microns and removing at least a portion of the water in the dispersion to form toner particles.

Other aspects and advantages of the invention will be apparent from the following description and the appended claims.

BRIEF DESCRIPTION OF DRAWINGS

FIG. 1 shows an extruder that may be used in formulating dispersions in accordance with embodiments of the present invention.

DETAILED DESCRIPTION

Embodiments of the present invention relate to aqueous dispersions and compounds made from aqueous dispersions that are useful as toner compositions. Dispersions used in embodiments of the present invention comprise water, (A) at least one thermoplastic resin, and (B) a stabilizing agent. These are discussed in more detail below. The compounds involve an aqueous dispersion and the addition of at least one of a colorant and a magnetic pigment, and may further include a number of additives. These components in the compound are discussed in more detail below.

Thermoplastic Resin

The thermoplastic resin (A) included in embodiments of the aqueous dispersion of the present invention is a resin that is not readily dispersible in water by itself. The term "resin," as used herein, should be construed to include synthetic polymers or chemically modified natural resins such as, but not limited to, thermoplastic materials such as polyvinyl chloride, polystyrene, polyesters, styrene acrylates, and polyethylene and thermosetting materials such as polyesters, epoxies, and silicones that are used with fillers, stabilizers, pigments, and other components to form plastics.

The term resin as used herein also includes elastomers and is understood to include blends of olefin polymers. In some embodiments, the thermoplastic resin is a semicrystalline resin. The term "semi-crystalline" is intended to identify those resins that possess at least one endotherm when subjected to standard differential scanning calorimetry (DSC) evaluation. Some semi-crystalline polymers exhibit a DSC endotherm that exhibits a relatively gentle slope as the scanning temperature is increased past the final endotherm maximum. This reflects a polymer of broad melting range rather than a polymer having what is generally considered to be a sharp melting point. Some thermoplastic resins useful in the dispersions of the invention have a single melting point while other polymers have more than one melting point.

In some thermoplastic resins, one or more of the melting points may be sharp such that all or a portion of the polymer melts over a fairly narrow temperature range, such as a few degrees centigrade. In other embodiments, the thermoplastic resins may exhibit broad melting characteristics over a range of about 20° C. In yet other embodiments, the thermoplastic resins may exhibit broad melting characteristics over a range of greater than 50° C.

In certain other embodiments, the thermoplastic resin may have a density between 0.8 and 1.5 g/cc. In other embodiments, the thermoplastic resin may have a density between 0.85 and 1.4 g/cc; between 0.86 and 1.3 g/cc in other embodiments, and between 0.87 and 1.2 g/cc in yet other embodiments.

Examples of the thermoplastic resin (A) that may be used in the present invention include homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate and vinyl butyrate and the like; vinyl esters such as esters of monocarboxylic acids, including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more. Examples of specific thermoplastic toner resins include styrene butadiene copolymers with a styrene content of from about 70 to about 95 weight percent.

Thermoplastic resins may include polymers containing at least one ester bond. For example, polyester polyols may be prepared via a conventional esterification process using a molar excess of an aliphatic diol or glycol with relation to an alkanedioic acid. Illustrative of the glycols that can be employed to prepare the polyesters are ethylene glycol, diethylene glycol; propylene glycol, dipropylene glycol, 1,3-propanediol, 1,4-butanediol and other butanediols, 1,5-pentanediol and other pentane diols, hexanediols, decanediols, and dodecanediols. In some embodiments, the aliphatic glycol may contain from 2 to about 8 carbon atoms. Illustrative of the dioic acids that may be used to prepare the polyesters are maleic acid, malonic acid, succinic acid, glutaric acid, adipic acid, 2-methyl-1,6-hexanoic acid, pimelic acid, suberic acid, and dodecanedioic acids. In some embodiments, the alkanedioic acids may contain from 4 to 12 carbon atoms. Illustrative of the polyester polyols are poly(hexanediol adipate), polybutylene glycol adipate), poly(ethylene glycol adipate), poly(diethylene glycol adipate), poly(hexanediol oxalate), and poly(ethylene glycol sebecate).

As another example, polyester resins obtained by condensation of a dicarboxylic acid components (these dicarboxylic acid components may be substituted by a sulfonic acid group, a carboxyl group, and the like) and alcoholic components (these alcoholic components may be substituted by the hydroxyl group, and the like), polyacrylic acid ester resins or polymethacrylic acid ester resins such as polymethylmethacrylate, polybutylmethacrylate, polymethylacrylate, polybutylacrylate, and the like; polycarbonate resin, polyvinyl acetate resin, styrene acrylate resin, styrene-methacrylic acid ester copolymer resin, vinyltoluene acrylate resin, and the like.

Thermoplastic resins may include homopolymers and copolymers of styrene and derivatives thereof such as polystyrene, poly-p-chlorostyrene, polyvinyltoluene, styrene-p-chlorostyrene copolymer and styrene vinyltoluene copolymer, copolymers of styrene and acrylates such as styrene methylacrylate copolymer, styrene ethylacrylate copolymer, and styrene-n-butyl acrylate copolymer; copolymers of styrene and methacrylate such as styrene-methylmethacrylate copolymer, styrene-ethylmethacrylate copolymer, and styrene-n-butylmethacrylate copolymer; polynary copolymers of styrene, acrylate and methacrylate; as well as styrenic copolymers such as copolymers of styrene and other vinylic monomer, such as styrene-acrylonitrile copolymer, styrene-vinylmethyl ether copolymer, styrene-butadiene copolymer, styrene-vinyl methyl ketone copolymer, styrene-acrylonitrile-indene copolymer and styrene-maleate copolymer; polymethyl methacrylate, polybutyl methacrylate, polyvinyl acetate, polyester, polyamide, epoxy resin, polyvinyl butyral, polyacrylic acid, phenolic resin, aliphatic or cycloaliphatic hydrocarbon resin, petroleum resin and chlorinated paraffin, which may be used alone or may be used in an appropriate combination thereof.

Thermoplastic resins may include suitable non-conjugated diene monomers such as straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD).

One class of desirable thermoplastic resins that may be used in accordance with embodiments disclosed herein includes elastomeric interpolymers of ethylene, a $C_3$-$C_{20}$ α-olefin, especially propylene, and optionally one or more diene monomers. Preferred α-olefins for use in this embodiment are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. The propylene-based polymers are generally referred to in the art as EP or EPDM polymers. Suitable dienes for use in preparing such polymers, especially multi block EPDM type polymers, include conjugated or non-conjugated, straight or branched chain-, cyclic- or polycyclic-dienes comprising from 4 to 20 carbon atoms. Dienes may include 1,4-pentadiene, 1,4-hexadiene, 5-ethylidene-2-norbornene, dicyclopentadiene, cyclohexadiene, and 5-butylidene-2-norbornene.

As one suitable type of thermoplastic resin, the esterification products of a di- or poly-carboxylic acid and a diol comprising a diphenol may be used. These resins are illustrated in U.S. Pat. No. 3,590,000, which is incorporated herein by reference. Other specific examples of toner resins include styrene/methacrylate copolymers, and styrene/butadiene copolymers; suspension polymerized styrene butadienes; polyester resins obtained from the reaction of bisphenol A and propylene oxide followed by the reaction of the resulting product with fumaric acid; and branched polyester resins resulting from the reaction of dimethylterphthalate, 1,3-butanediol, 1,2-propanediol, and pentaerythritol, styrene acrylates, and mixtures thereof.

Further, specific embodiments of the present invention employ ethylene-based polymers, propylene-based polymers, propylene-ethylene copolymers, and styrenic copolymers as one component of a composition. Other embodiments of the present invention use polyester resins, including those containing aliphatic diols such as UNOXOL 3,4 diol available from The Dow Chemical Company (Midland, Mich.).

In selected embodiments, one component is formed from ethylene-alpha olefin copolymers or propylene-alpha olefin copolymers. In particular, in select embodiments, the thermoplastic resin comprises one or more non-polar polyolefins.

In specific embodiments, polyolefins such as polypropylene, polyethylene, copolymers thereof, and blends thereof, as well as ethylene-propylene-diene terpolymers, may be used. In some embodiments, preferred olefinic polymers include homogeneous polymers, as described in U.S. Pat. No. 3,645,992 issued to Elston; high density polyethylene (HDPE), as described in U.S. Pat. No. 4,076,698 issued to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

Polymer compositions, and blends thereof, described in U.S. Pat. Nos. 6,566,446, 6,538,070, 6,448,341, 6,316,549, 6,111,023, 5,869,575, 5,844,045, or 5,677,383, each of which is incorporated herein by reference in its entirety, may also be suitable in some embodiments. In some embodiments, the blends may include two different Ziegler-Natta polymers. In other embodiments, the blends may include blends of a Ziegler-Natta polymer and a metallocene polymer. In still other embodiments, the thermoplastic resin used herein may be a blend of two different metallocene polymers. In other embodiments, single site catalyst polymers may be used.

In some embodiments, the thermoplastic resin is a propylene-based copolymer or interpolymer. In some particular embodiments, the propylene/ethylene copolymer or interpolymer is characterized as having substantially isotactic propylene sequences. The term "substantially isotactic propylene sequences" and similar terms mean that the sequences have an isotactic triad (mm) measured by 13C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by 13C NMR spectra.

In other particular embodiments, the thermoplastic resin may be ethylene vinyl acetate (EVA) based polymers. In other embodiments, the base polymer may be ethylene-methyl acrylate (EMA) based polymers. In other particular embodiments, the ethylene-alpha olefin copolymer may be ethylene-butene, ethylene-hexene, or ethylene-octene copolymers or interpolymers. In other particular embodiments, the propylene-alpha olefin copolymer may be a propylene-ethylene or a propylene-ethylene-butene copolymer or interpolymer.

Embodiments disclosed herein may also include a polymeric component that may include at least one multi-block olefin interpolymer. Suitable multi-block olefin interpolymers may include those described in, for example, U.S. Provisional Patent Application No. 60/818,911, incorporated herein by reference. The term "multi-block copolymer" or "multi-block interpolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

Other olefin interpolymers include polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α-olefin, optionally comprising a $C_4$-$C_{20}$ diene, may be used.

In certain embodiments, the thermoplastic resin may be an ethylene-octene copolymer or interpolymer having a density between 0.863 and 0.911 g/cc and melt index (ASTM D1238, 190° C. with 2.16 kg weight) from 0.1 to 100 g/10 min. In other embodiments, the ethylene-octene copolymers may have a density between 0.863 and 0.902 g/cc and melt index (ASTM D1238, 190° C. with 2.16 kg weight) from 0.8 to 35 g/10 min.

In certain embodiments, the thermoplastic resin may be a propylene-ethylene copolymer or interpolymer having an ethylene content between 5 and 20% by weight and a melt flow rate (ASTM D1238, 230° C. with 2.16 kg weight) from 0.5 to 300 g/10 min. In other embodiments, the propylene-ethylene copolymer or interpolymer may have an ethylene content between 9 and 12% by weight and a melt flow rate (ASTM D1238, 230° C. with 2.16 kg weight) from 1 to 100 g/10 min.

In certain other embodiments, the thermoplastic resin may be a highly branched low density polyethylene having a density between 0.911 and 0.925 g/cc and melt index (ASTM D1238, 190° C. with 2.16 kg weight) from 0.1 to 100 g/10 min.

In other embodiments, the thermoplastic resin may have a crystallinity of less than 50 percent. In preferred embodiments, the crystallinity of the thermoplastic resin may be from 5 to 35 percent. In more preferred embodiments, the crystallinity may range from 7 to 20 percent.

In certain other embodiments, the thermoplastic resin is a semi-crystalline polymer and may have a melting point of less than 110° C. In preferred embodiments, the melting point may be from 25 to 100° C. In more preferred embodiments, the melting point may be between 40 and 85° C.

In other embodiments, the thermoplastic resin is a glassy polymer and may have a glass transition temperature of less than 130° C.; less than 110° C. in other embodiments. In preferred embodiments, the glass transition temperature may be from 20 to 100° C. In more preferred embodiments, the glass transition temperature may be from 50 to 75° C.

In certain embodiments, the thermoplastic resin may have a weight average molecular weight greater than 10,000 g/mole. In other embodiments, the weight average molecular weight may be from 20,000 to 150,000 g/mole; in yet other embodiments, from 50,000 to 100,000 g/mole.

The one or more thermoplastic resins may be contained within the aqueous dispersion in an amount from about 1% by weight to about 96% by weight. For instance, during particle formation, the thermoplastic resin may be present in the aqueous dispersion in an amount from about 40% by weight to about 95% by weight, such as from about 45% to 90% by weight in some embodiments, and from about 60% to about 80% by weight in yet other embodiments. After particle formation, the dispersion can be further diluted to aid in handling.

In one or more embodiments of the present invention, one or more resins selected from the following may be used in the dispersion disclosed herein to form a toner composition. Suitable resins include SAA100, SAA101, and SAA104, which are commercially available from Lyondell Chemical and comprise styrenic/allyl alcohol copolymers having 60-80% styrene, weight average molecular weight from 3,000 to 8,000, number average molecular weight from 1,500 to 3,200, and glass transition temperature from 57 to 78° C.; the DIANAL® FB series (styrenic-acrylic copolymers) and DIACRON® series (polyester resins), and acrylic resins including SE-5437, SE-5102, SE-5377, SE-5649, SE-5466, SE-5482, HR-169, 124, HR-1127, HR-116, HR-113, HR-148, HR-131, HR-470, HR-634, HR-606, HR-607, LR-1065, 574, 143, 396, 637, 162, 469, 216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117, which are commercially available from Misubishi Rayon Co Ltd. and its subsidiary Dianal America, Inc.; Himer ST95 and ST120, which are acrylic copolymers commercially available from Sanyo Chemical Industries, Ltd.; FM601, which is an acrylic resin commercially available from Mitsui Chemicals; HRJ11441, which is a branched partially crosslinked polyester resin commercially available from Schenectady Intl; TUF-TONE® NE-382, TUFTONE® U-5, ATR-2009, and ATR-2010, which are polyester resins commercially available from Kao Specialties Americas, LLC; S103C and S111, which are styrene acrylonitrile terpolymers commercially available from Zeon Chemicals, LP; LUPRETON® resins, which polyester resins with color concentrates commercially available from BASF Corp.; FINE-TONE® T382ESHHMW, T382ES, T6694, TCX 100, TCX700, TPL400TRM70, which are polyester resins commercially available from Reichhold Chemicals, Inc.; TOPAS® TM, TOPAS® TB, and TOPAS® 8007, which are cyclic olefin copolymers commercially available from Ticona GMBH Corp.; S-LEC resins, including SE-0020, SE-0030, SE-0040, SE-0070, SE-0080, SE-0090, SE-0100, SE-1010, and SE-1035, which are styrene-acrylic copolymers commercially available from Sekisui Chemical Co., Ltd.; BAILON 290, BAILON 200, BAILON 300, BAILON 103, BAILON GK-140, and BAILON GK-130 which are commercially available from Toyobo Co., Ltd; Eritel UE3500, UE3210, and XA-8153, which are commercially available from Unitika Ltd.; and Polyester TP-220 and R-188, which are commercially available from The Nippon Synthetic Chemical Industry Co., Ltd.

Those having ordinary skill in the art will recognize that the above list is a non-comprehensive listing of suitable polymers. It will be appreciated that the scope of the present invention is restricted by the claims only.

Stabilizing Agent

Embodiments of the present invention use a stabilizing agent to promote the formation of a stable dispersion or emulsion. In selected embodiments, the stabilizing agent may be a surfactant, a polymer (different from the thermoplastic resin detailed above), or mixtures thereof. In other embodiments, the thermoplastic resin is a self-stabilizer, so that an additional exogenous stabilizing agent may not be necessary. For example, a self-stabilizing system may include a partially hydrolyzed polyester, where by combining polyester with an aqueous base, a polyester resin and surfactant-like stabilizer molecule may be produced. In addition, stabilizing agents may be used alone or in a combination of two or more.

In certain embodiments, the stabilizing agent may be a polar polymer, having a polar group as either a comonomer or grafted monomer. In preferred embodiments, the stabilizing agent may include one or more polar polyolefins, having a polar group as either a comonomer or grafted monomer. Typical polymers include ethylene-acrylic acid (EAA) and ethylene-methacrylic acid copolymers, such as those available under the trademarks PRIMACOR™ (trademark of The Dow Chemical Company), NUCREL™ (trademark of E.I. DuPont de Nemours), and ESCOR™ (trademark of Exxon-Mobil) and described in U.S. Pat. Nos. 4,599,392, 4,988,781, and 5,938,437, each of which is incorporated herein by reference in its entirety. Other suitable polymers include ethylene-ethyl acrylate (EEA) copolymer, ethylene-methyl methacrylate (EMMA), and ethylene-butyl acrylate (EBA). Other ethylene-carboxylic acid copolymers may also be used. Those having ordinary skill in the art will recognize that a number of other useful polymers may also be used.

If the polar group of the polymer is acidic or basic in nature, the stabilizing polymer may be partially or fully neutralized with a neutralizing agent to form the corresponding salt. The salts may be alkali metal or ammonium salts of the fatty acid, prepared by neutralization of the acid with the corresponding base, e.g., NaOH, KOH, and $NH_4OH$. These salts may be formed in situ in the dispersion step, as described more fully below. In certain embodiments, neutralization of the stabilizing agent, such as a long chain fatty acid or EAA, may be from 10 to 200% on a molar basis; from 25 to 200% on a molar basis in other embodiments; from 20 to 110% on a molar basis in other embodiments, and from 50 to 110% on a molar basis in yet other embodiments. For example, for EAA, the neutralizing agent is a base, such as ammonium hydroxide or potassium hydroxide. Other neutralizing agents can include lithium hydroxide or sodium hydroxide, for example. Those having ordinary skill in the art will appreciate that the selection of an appropriate neutralizing agent depends on the specific composition formulated, and that such a choice is within the knowledge of those of ordinary skill in the art.

Other surfactants that may be used include long chain fatty acids or fatty acid salts having from 12 to 60 carbon atoms. In other embodiments, the long chain fatty acid or fatty acid salt may have from 12 to 40 carbon atoms.

Additional surfactants that may be useful in the practice of the present invention include cationic surfactants, anionic surfactants, non-ionic surfactants, or combinations thereof. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful as a stabilizing agent may be either external surfactants or internal surfactants. External surfactants are surfactants that do not become chemically reacted into the polymer during dispersion preparation. Examples of external surfactants useful herein include salts of dodecyl benzene sulfonic acid and lauryl sulfonic acid. Internal surfactants are surfactants that do become chemically reacted into the polymer during dispersion preparation. An example of an internal surfactant useful herein includes 2,2-dimethylol propionic acid and its salts or sulfonated polyols neutralized with ammonium chloride.

In particular embodiments, the dispersing agent or stabilizing agent may be used in an amount ranging from greater than zero to about 60% by weight based on the amount of thermoplastic resin (or thermoplastic resin mixture) used. With respect to the thermoplastic resin and the dispersion stabilizing agent, in some embodiments, the thermoplastic resin may comprise between about 30% to 99% (by weight) of the total amount of thermoplastic resin and dispersion stabilizing agent in the composition. In other embodiments, the thermoplastic resin may comprise between about 50% and about 80% (by weight) of the total amount of thermoplastic resin and dispersion stabilizing agent in the composition. In yet other embodiments, the thermoplastic resins may comprise about 70% (by weight) of the total amount of thermoplastic resin and dispersion stabilizing agent in the composition. For example, long chain fatty acids or salts thereof may be used from 0.5 to 10% by weight based on the amount of thermoplastic resin. In other embodiments, ethylene-acrylic acid or ethylene-methacrylic acid copolymers may be used in an amount from 0.5 to 60% by weight based on the amount of the thermoplastic resin. In yet other embodiments, sulfonic acid salts may be used in an amount from 0.5 to 10% by weight based on the amount of thermoplastic resin.

Colorant

Embodiments of the present invention may employ a colorant as part of the composition. A variety of colors may be used. Typically, colors such as yellow, magenta, and cyan may be used. As a black coloring agent, carbon black, a magnetic material, and a coloring agent toned to black using the yellow/magenta/cyan coloring agents shown below may be used.

As a yellow coloring agent, compounds typified by a condensed azo compound, an isoindolynone compound, an anthraquinone compound, an azometal complex methine compound, and an allylamide compound as pigments may be used. Specifically, C.I. pigment yellows 3, 7, 10, 12 to 15, 17, 23, 24, 60, 62, 74, 75, 83, 93 to 95, 99, 100, 101, 104, 108 to 111, 117, 123, 128, 129, 138, 139, 147, 148, 150, 166, 168 to 177, 179, 180, 181, 183, 185, 191:1, 191, 192, 193, and 199 may be suitable for use as a yellow coloring agent. Examples of dyes include C.I. solvent yellows 33, 56, 79, 82, 93, 112, 162, and 163, and C.I. disperse yellows 42, 64, 201, and 211.

As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. Specifically, C.I. pigment reds 2, 3, 5 to 7, 23, 48:2, 48:3, 48:4, 57:1, 81:1, 122, 146, 166, 169, 177, 184, 185, 202, 206, 220, 221, and 254, and C.I. pigment violet 19 may be suitable for use as a magenta coloring agent.

As a cyan coloring agent, a copper phthalocyanine compound and its derivative, an anthraquinone compound, a base dye lake compound, and the like may be used. Specifically, C.I. pigment blues 1, 7, 15, 15:1, 15:2, 15:3, 15:4, 60, 62, and 66 may be suitable for use as a cyan coloring agent.

These coloring agents may be used singly, in mixture, or as a solid solution. The coloring agent of the present invention is selected in terms of the hue angle, saturation, brightness, weather resistance, OHP transparency, and dispersibility into the toner. The coloring agent may be added in an amount of 0.5 to 20 parts by weight based on 100 parts by weight of the thermoplastic resin.

Magnetic Pigment

Further, the toner of the present invention may contain a magnetic material and be used as a magnetic toner. In this case, the magnetic material may also function as a coloring agent. Examples of the magnetic material contained in a magnetic toner in the present invention include iron oxides such as magnetite, hematite, and ferrite; metals such as iron, cobalt, and nickel, or alloys of these metals with metals such as aluminum, cobalt, copper, lead, magnesium, tin, zinc, antimony, beryllium, bismuth, cadmium, calcium, manganese, selenium, titanium, tungsten, and vanadium; and mixtures thereof.

The magnetic material used in the present invention may preferably be a surface modified magnetic material. Examples of surface modifiers that may be used to hydrophobically treat magnetic material include a silane coupling agent and a titanium coupling agent.

The magnetic material used in the compounds disclosed here may have a mean particle size of 2 µm or smaller, preferably from 0.1 to 0.5 µm. The magnetic material may be included in the compound in an amount ranging from 20 to 200 parts by weight, preferably from 40 to 150 parts by weight, based on 100 parts by weight of the thermoplastic resin.

The magnetic material preferably has magnetic properties when 796 kA/m (10 k oersted) is applied such as a coercive force (He) of 1.59 to 23.9 kA/m (20 to 300 oersted), a saturation magnetization (as) of 50 to 200 emu/g, and a remnant magnetization (or) of 2 to 20 emu/g.

Charge Control Agent

In certain embodiments of the present invention, a charge control agent may be included in the compounds disclosed herein. Examples of a charge control agent used to control the charge to be negative include an organometallic compound, a chelate compound, a monoazometallic compound, an acetylacetone metallic compound, a urea derivative, a metal-containing salicylic acid compound, a metal-containing naphthoic acid compound, a tertiary ammonium salt, calixarene, a silicon compound, and a non-metal carboxylic acid compound and its derivative.

Examples of a charge control agent used to control the charge to be positive include nigrosine and its modified product by a fatty acid metal salt; quaternary ammonium salts such as tributylbenzylammonium-1-hydroxy-4-naph-thosulfonate and tetrabutylammonium tetrafluoroborate, and onium salts and their analogues such as a phosphonium salt, and their lake pigments, and triphenylmethane dyes and their lake pigments, of which laking agents include phosphotungstic acid, phosphomolybdic acid, phosphotungsticmolybdic acid, tannic acid, lauric acid, gallic acid, a ferricyanide, and a ferrocyanide; metal salts of higher fatty acids; diorganotin oxides such as dibutyltin oxide, dioctyltin oxide, and dicyclohexyltin oxide; and diorganotin borates such as dibutyltin borate, dioctyltin borate, and dicyclohexyltin borate. These may be used singly or in a combination of two or more. Of these, charge control agents such as nigrosins and quaternary ammonium salts may be preferable.

The toner compound may include a charge control agent in an amount ranging from 0.01 to 20 parts by weight, preferably from 0.5 to 10 parts by weight, based on 100 parts by weight of the thermoplastic resin in the toner.

Other Additives

A number of other additives, known to those of ordinary skill in the art, may be used in embodiments of the present invention. For example, an additive may be used in order to improve various properties of the toner. Examples of such additives include metal oxides such as silicon oxide, aluminum oxide, titanium oxide, and hydrotalcite; carbon black, and fluorocarbon. Preferably, these additives may be hydrophobically treated.

Other additives that may be used to improve various properties of the toner include waxes such as metallocene waxes and polypropylene waxes.

A polishing agent may be used in accordance with embodiments of the present invention. Typical polishing agents include strontium titanate; metal oxides such as cerium oxide, aluminum oxide, magnesium oxide, and chromium oxide; nitrides such as silicon nitride; carbides such as silicon carbide; and metal salts such as calcium sulfate, barium sulfate, and calcium carbonate.

A lubricant may be used in accordance with embodiments of the present invention. Typically lubricants include fluororesin powders such as vinylidene fluoride and polytetrafluoroethylene; and fatty acid metal salts such as zinc stearate and calcium stearate.

Additionally, charge controlling particles include metal oxides such as tin oxide, titanium oxide, zinc oxide, silicon oxide, and aluminum oxide; and carbon black.

These additives may be used in an amount ranging from 0.1 to 10 parts by weight, preferably from 0.1 to 5 parts by weight, based on 100 parts by weight of the toner particles. These external additives may be used singly or in a combination.

Formulations

In preferred formulations, dispersions in accordance with the present invention. may include a thermoplastic resin, a stabilizing agent (which may be polymeric or a surfactant), and at least one of a colorant and a magnetic pigment. A number of other additives, depending on the particular formulation, and the nature of the toner to be produced may also be used.

In one embodiment, a thermoplastic resin, a stabilizing agent, and at least one of a colorant and a magnetic pigment are melt-kneaded in an extruder along with water and a neutralizing agent, such as ammonia, potassium hydroxide, or a combination of the two to form a dispersion compound. The additives may be mixed with the thermoplastic resin either during or prior to the formation of the dispersion and/or extrusion. Those having ordinary skill in the art will recognize that a number of other neutralizing agents may be used. In some embodiments, the at least one of a colorant and a magnetic pigment may be added after blending the thermoplastic resin and stabilizing agent. in other preferred embodiments, the at least one of a colorant and a magnetic pigment may be added after the dispersion is formed. In addition, any other suitable additive (such as any of those discussed above) may be added to the composition prior to the formation of the dispersion.

In another embodiment, a thermoplastic resin, such as a self-stabilizing resin, and at least one of a colorant and a magnetic pigment are melt-kneaded in an extruder along with water and a neutralizing agent, such as ammonia, potassium hydroxide, or a combination of the two to form a dispersion compound. In yet another embodiment, a thermoplastic resin, a stabilizing agent, and at least one of a colorant and a magnetic pigment are melt-kneaded in an extruder along with water without use of a neutralizing agent to form a dispersion compound.

Any melt-kneading means known in the art may be used. In some embodiments, a kneader, a BANBURY® mixer, a single-screw extruder, or a multi-screw extruder is used. A process for producing the dispersions in accordance with the present invention is not particularly limited. Any reference to use of an extruder herein is not intended to be a limitation on the present invention. One preferred process, for example, is a process comprising melt-kneading the above-mentioned components according to U.S. Pat. No. 5,756,659 and U.S. Pat. No. 6,455,636, which are herein incorporated by reference in their entirety. An alternative example in which an extruder is not required allows for the mechanical dispersion to be formed in a high shear mixer. The high shear mixer may be specifically applicable to dispersions using polyesters and some styrenic copolymers, for example.

FIG. 1 schematically illustrates an extrusion apparatus that may be used in embodiments of the invention. An extruder 20, in certain embodiments a twin screw extruder, is coupled to a back pressure regulator, melt pump, or gear pump 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments, the base and initial water are preheated in a preheater.

Thermoplastic resin in the form of pellets, powder or flakes is fed from the feeder 80 to an inlet 90 of the extruder 20 where the thermoplastic resin is melted or compounded. In some embodiments, the dispersing agent is added to the thermoplastic resin through and along with the thermoplastic resin and in other embodiments, the dispersing agent is provided separately to the twin screw extruder 20. The thermoplastic resin melt is then delivered from the mix and convey zone to an emulsification zone of the extruder where the initial amount of water and base from the reservoirs 40 and 50 is added through inlet 55. In some embodiments, dispersing agent may be added additionally or exclusively to the water stream. In some embodiments, the emulsified mixture is further diluted with additional water through inlet 95 from reservoir 60 in a dilution and cooling zone of the extruder 20. Typically, the dispersion is diluted to at least 30 weight percent water in the cooling zone. In addition, the diluted mixture may be diluted any number of times until the desired dilution level is achieved. In some embodiments, water is not added into the twin screw extruder 20 but rather to a stream containing the resin melt after the melt has exited from the extruder. In this manner, steam pressure build-up in the extruder 20 is eliminated.

Advantageously, by using an extruder in certain embodiments, the thermoplastic resin and the stabilizing agent may be blended in a single process to form a dispersion. Also, advantageously, by using one or more of the stabilizing agents listed above, the dispersion is stable with respect to the additives.

Dispersions formed in accordance with embodiments of the present invention are characterized as having an average particle size of between about 0.05 to about 10 microns. In other embodiments, the dispersion may have an average particle size between about 0.05 to about 8.0 microns. In other embodiments, dispersions have an average particle size of from about 0.1 to about 6.0 microns. As used herein, "average particle size" refers to the volume-mean particle size. In order to measure the particle size, laser-diffraction techniques may be employed, for example. A particle size in this description refers to the diameter of the polymer in the dispersion. For polymer particles that are not spherical, the diameter of the particle is the average of the long and short axes of the particle. Particle sizes can be measured, for example, on a Beckman-Coulter LS230 laser-diffraction particle size analyzer or other suitable device. In one embodiment, the desired particle sizes may be obtained by forming very small particles and aggregating these to the desired particle size.

After forming the dispersion, at least a portion of the water may be removed to form toner particles. In selected embodiments, substantially all of the water may be removed to form base toner particles. In one embodiment, drying of the dispersion may be accomplished by spray drying the dispersion.

As is known, spray drying involves the atomization of a liquid feedstock into a spray of droplets and contacting the droplets with hot air in a drying chamber. The sprays are typically produced by either rotary (wheel) or nozzle atomizers. Evaporation of moisture from the droplets and formation of dry particles proceed under controlled temperature and airflow conditions. Powder is discharged substantially continuously from the drying chamber. Operating conditions and dryer design are selected according to the drying characteristics of the product and powder specification. Other drying techniques known in the art may also be used, including fluid bed drying, vacuum drying, radiant drying, and flash drying, among others.

Thus, in one embodiment, a dispersion may be formed, and shipped to another location, where the dispersion is subjected to a post-treatment process such as spray drying to form a toner powder.

In select embodiments, it is advantageous to add auxiliary fine particles to the base toner particles in order to improve the fluidity, the electrification stability, or the blocking resistance at a high temperature, etc. The auxiliary fine particles to be fixed on the surface of the base toner particles may be suitably selected for use among various inorganic or organic fine particles.

As the inorganic fine particles, various carbides such as silicon carbide, boron carbide, titanium carbide, zirconium carbide, hafnium carbide, vanadium carbide, tantalum carbide, niobium carbide, tungsten carbide, chromium carbide, molybdenum carbide and calcium carbide, various nitrides such as boron nitride, titanium nitride and zirconium nitride, various borides such as zirconium boride, various oxides such as titanium oxide, calcium oxide, magnesium oxide, zinc oxide, copper oxide, aluminum oxide, cerium oxide, silica and colloidal silica, various titanate compounds such as calcium titanate, magnesium titanate and strontium titanate, phosphate compounds such as calcium phosphate, sulfides such as molybdenum disulfide, fluorides such as magnesium fluoride and carbon fluoride, various metal soaps such as aluminum stearate, calcium stearate, zinc stearate and magnesium stearate, talc, bentonite, various carbon black and conductive carbon black, magnetite and ferrite, may, for example, be employed. As the organic fine particles, fine particles of a styrene resin, an acrylic resin, an epoxy resin or a melamine resin, may, for example, be employed.

Among such auxiliary fine particles, silica, titanium oxide, alumina, zinc oxide, various carbon black or conductive carbon black may, for example, be particularly preferably employed. Further, such auxiliary fine particles may include the above mentioned inorganic or organic fine particles, where the surface of the particles is treated by surface treatment, such as hydrophobic treatment by a treating agent such as a silane coupling agent, a titanate coupling agent, a silicone oil, a modified silicone oil, a silicone varnish, a fluorinated silane coupling agent, a fluorinated silicone oil or a coupling agent having amino groups or quaternary ammonium bases. Such treating agents may be used alone or in combination as a mixture of two or more of them.

The above auxiliary fine particles may have an average particle size of from 0.001 to 3 μm, preferably from 0.005 to 1 μm, and a plurality having different particle sizes may be used in combination. The average particle size of the auxiliary fine particles may be obtained by observation by an electron microscope.

As the above auxiliary fine particles, two or more different types of auxiliary fine particles may be used in combination. For example, surface-treated particles and non-surface-treated particles may be used in combination, or differently surface-treated particles may be used in combination. Otherwise, positively chargeable particles and negatively chargeable particles may be suitably combined for use.

As a method for adding the auxiliary fine particles to the base toner particles, a method is known to add and blend them by means of a high speed stirring machine such as a Henschel mixer. However, in order to improve the blocking resistance at a high temperature, it is preferred to have the auxiliary fine particles fixed on the surface of the base toner particles. In the present invention, fixing means an addition method employing an apparatus capable of exerting a compression sharing stress (hereinafter referred to as a compression shearing treatment apparatus) or an apparatus capable of melting or softening the surface of the base toner particles (hereinafter referred to as a particle surface-melting treatment apparatus). By such fixing treatment, the auxiliary fine particles may be firmly fixed to the surface of the base toner particles without substantial pulverization of the base toner particles, whereby blocking resistance during storage at a high temperature may be improved, and it is possible to produce a toner which is less likely to bring about fusion to components of a copying machine or a printer even in a continuous copying operation.

The above-mentioned compression shearing treatment apparatus is constructed to have a narrow clearance defined by a head surface and a head surface, a head surface and a wall surface, or a wall surface and a wall surface, which are mutually mobile while a distance is maintained, so that the particles to be treated are forcibly passed through the clearance, whereby a compression stress and a shearing stress will be exerted to the surface of the particles without substantially pulverizing them. As the compression shearing treatment apparatus to be used, a mechanofusion apparatus manufactured by Hosokawa Micron K.K., may, for example, be mentioned.

The above-mentioned particle surface-melting treatment apparatus is usually constructed so that a mixture of the base toner fine particles and the auxiliary fine particles is instantaneously heated to a temperature of at least the melting-initiation temperature by means of, for example, a hot air stream thereby to have the auxiliary fine particles fixed. As the particle surface-melting treatment apparatus to be used, a surfusing system manufactured by Nippon Neumatic K.K. may, for example, be mentioned.

In another embodiment, the thermoplastic resin may be formed in a continuous or in situ polymerization process. In this embodiment, a mechanical dispersion or emulsion of monomers in an aqueous solution may be formed. Polymerization of the monomers may occur either during or after the emulsification. Additives may be added to the system either during or after the emulsification and/or polymerization. In another embodiment, a resin produced by a continuous polymerization process may be directly coupled to emulsification and finishing processes.

Applications

The toners described above may be used in cartridges, process cartridges, and image forming apparatus. For example, process cartridges using toners described herein may include photoconductors, charging units, developing units, cleaning units, and may be attached to the main body of an image forming apparatus in an attachable and detachable manner. As another example, toner cartridges may include an electrostatic image bearing member, and a developing means to form a visible image by developing with a toner a latent electrostatic image formed on the image bearing member. Image forming apparatus may include a latent electrostatic image bearing member, a latent electrostatic image forming means, a developing means for developing the electrostatic image and forming a visible image, a transferring means that transfers the visible image to a substrate medium, and a fixing means the fixes the transferred image to the substrate medium. Cartridges, process cartridges, and image forming apparatus are disclosed in, for example, U.S. Pat. Nos. 7,177,582, 7,177,570, 7,169,525, 7,166,401, 7,161,612, 6,477,348, 5,974,281, and others.

EXAMPLES

Embodiments of the present invention may have a thermoplastic resin component (A) plus stabilizing agent in an amount of about 45% to about 99% by weight of the overall toner composition. In other embodiments, this may range from 60% to 80%. Further, embodiments of the present invention may use colorant in an amount from greater than about 0% to about 30% by weight of the overall toner composition. Still further, embodiments of the present invention may use magnetic pigment in an amount from greater than about 0% to about 50% by weight of the overall toner composition. Still further, embodiments of the present invention may use a number of additional additives, in an amount of greater than about 0% to about 10% by weight of the overall toner composition.

In one embodiment, the toner may include 5-15 wt. % black pigment, 2-5 wt. % polyester resin, 70-85 wt. % styrene butyl acrylate resin, 0.2-0.8 wt. % CCA, 5-15 wt. % wax (ester wax), 0.5-2 wt. % silica (may be added after toner is made), 0.5-2 wt. % TiO2 (may be added after toner is made), and 0.5-2 wt. % surfactant (based on solids). In a particular embodiment, the toner may include 9 wt. % black pigment, 3.5 wt. % polyester resin, 77 wt. % styrene butyl acrylate resin, 0.5 wt. % CCA, 10 wt. % wax (ester wax), 1 wt. % silica, 1 wt. % TiO2, and 1 wt. % surfactant (based on solids).

In one embodiment, a cyan color toner may be prepared by forming an aqueous dispersion with a 79 wt. % styrene butyl acrylate copolymer, 2 wt. % zinc salicylic acid, a charge control agent, 4 wt. % polypropylene wax, 1 wt. % silica powder, 9.5 wt. % pigment dispersion of 30.8 wt. % BFD-1121 pigment blue, 60 wt. % water, and 9.2 wt. % acrylic polymer stabilizer, and 4.5 wt. % Keystone Blue GN, a dry pigment available from Keystone Aniline Co. The mixture may be extruded and dried to remove excess water. Post-additive agents that may be included to enhance flow control include 1 wt. % hydrophobic silane-treated silica and 0.7 wt. % hydrophobic titanium dioxide.

In another embodiment, a yellow color toner may be prepared by forming an aqueous dispersion with a 77 wt. % styrene butyl acrylate copolymer, 2 wt. % zinc salicylic acid, a charge control agent, 4 wt. % polypropylene wax, 1% silica powder, 11.5 wt. % pigment dispersion of 30.8 wt. % YFD-4244 pigment yellow, 60 wt. % water, and 9.2 wt. % acrylic polymer stabilizer, and 4.5 wt. % Clarient Permanent Yellow 17, a dry pigment available from Keystone Aniline Co. The mixture may be extruded and dried to remove excess water. Post-additive agents that may be included to enhance flow control include 1 wt. % hydrophobic silane-treated silica and 0.7 wt. % hydrophobic titanium dioxide.

In one embodiment, a magenta color toner may be prepared by forming an aqueous dispersion with a 69 wt. % styrene butyl acrylate copolymer, 2 wt. % zinc salicylic acid, a charge control agent, 4 wt. % polypropylene wax, 21 wt. % pigment dispersion of 30.8 wt. % QFD-1146 pigment red, 60 wt. % water, and 9.2 wt. % acrylic polymer stabilizer, and 4 wt. % Clarient Hostacopy M-501 Pigment Red 122, a dry pigment available from Keystone Aniline Co. The mixture may be extruded and dried to remove excess water. Post-additive agents that may be included to enhance flow control include 1 wt. % hydrophobic silane-treated silica and 0.7 wt. % hydrophobic titanium dioxide.

In yet another embodiment, a magnetic black toner may be prepared by forming an aqueous dispersion with 100 parts polyester, 95 parts magnetite, 1 part polydimethylsiloxane, and 1 part conductive carbon black.

Advantageously, embodiments disclosed herein allow for a broad range of polymers to be used in toner compositions. Further, embodiments disclosed herein may involve a non-solvent, monomer-free process, which is environmentally superior to prior art processes. Further, embodiments may provide for smaller particle sizes, and narrower particle size distributions than in the prior art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming a toner, the method comprising:
   forming a compound, the compound comprising:
     an aqueous dispersion comprising:
       a thermoplastic resin;
       wherein the dispersion has an average volume diameter particle size from about 0.05 to about 10 microns; and
       at least one selected from the group consisting of a colorant and a magnetic pigment; and
     removing at least a portion of the water in the dispersion to form toner particles.

2. The method of claim 1, wherein the forming the compound comprises melt kneading and dispersing the thermoplastic resin and optionally additional components in an extruder.

3. The method of claim 1, wherein the forming the compound comprises;
   melt kneading the thermoplastic resin and optionally additional compounds in a melt kneader to form a resin melt; and
   dispersing the resin melt in an aqueous phase.

4. The method of claim 1, wherein the thermoplastic resin is a self-stabilizing resin.

5. The method of claim 1, wherein the dispersion further comprises a neutralizing agent.

6. The method of claim 5, wherein the dispersion further comprises a stabilizing agent.

7. The method of claim 1, wherein the dispersion further comprises a stabilizing agent.

8. The method of claim 1, further comprising post-treating the toner particles.

9. The method of claim 8, wherein the removing comprises spray-drying the compound.

10. The method of claim 1, wherein the compound further comprises at least one of auxiliary fine particles, a charge control agent, a lubricant, and a polishing agent.

11. The method of claim 1, wherein the thermoplastic resin comprises at least one polyester formed by reacting an aliphatic diol with a diacid.

12. A method of using toner formed in claim 1, the method comprising:
    disposing the toner formed in claim 1 in a process cartridge.

13. The method of claim 12, further comprising attaching the process cartridge to an image forming device.

\* \* \* \* \*